United States Patent
Cornaglia

(10) Patent No.: US 9,334,838 B2
(45) Date of Patent: May 10, 2016

(54) AIR FILTER CARTRIDGE FOR I.C. MOTORS, METHOD FOR ITS MANUFACTURE AND AIR FILTER INCORPORATING SAID CARTRIDGE

(71) Applicant: OFFICINE METALLURGICHE G. CORNAGLIA S.P.A., Beinasco (TO) (IT)

(72) Inventor: Umberto Cornaglia, Moncalieri (IT)

(73) Assignee: OFFICINE METALLURGICHE G. CORNAGLIA S.P.A., Beinasco (TO) (IT)

( * ) Notice: Subject to any disclaimer, the term of this patent is extended or adjusted under 35 U.S.C. 154(b) by 0 days.

(21) Appl. No.: 14/382,415

(22) PCT Filed: Mar. 1, 2013

(86) PCT No.: PCT/IB2013/051640
§ 371 (c)(1),
(2) Date: Sep. 2, 2014

(87) PCT Pub. No.: WO2013/128417
PCT Pub. Date: Sep. 6, 2013

(65) Prior Publication Data
US 2015/0107201 A1    Apr. 23, 2015

(30) Foreign Application Priority Data
Mar. 2, 2012  (IT) ............... TO2012A0185

(51) Int. Cl.
*B01D 46/00*    (2006.01)
*F02M 35/02*    (2006.01)
(Continued)

(52) U.S. Cl.
CPC ......... *F02M 35/0215* (2013.01); *B01D 46/125* (2013.01); *B01D 46/2411* (2013.01);
(Continued)

(58) Field of Classification Search
CPC .... B01D 46/02; B01D 46/125; B01D 46/522; B01D 46/525
USPC ................... 55/484, 521; 210/493.1; 493/405
See application file for complete search history.

(56) References Cited

U.S. PATENT DOCUMENTS

2007/0209343 A1* 9/2007 Cuvelier ............. B01D 46/002
    55/484
2011/0186504 A1* 8/2011 Rocklitz ............... B01D 25/26
    210/493.1

FOREIGN PATENT DOCUMENTS

DE   20 2009 000 969 U1   8/2010
EP    2 168 649 A1    3/2010
(Continued)

OTHER PUBLICATIONS

International Search Report and Written Opinion issued in PCT/IB2013/051640 mailed Jun. 6, 2013.

*Primary Examiner* — Jason M Greene
*Assistant Examiner* — Karla Hawkins
(74) *Attorney, Agent, or Firm* — RatnerPrestia

(57) ABSTRACT

Air filter cartridge for I.C. motors, including a body in which there are defined, in the flow direction of the air to be filtered, an upstream face and a downstream face of the cartridge, wherein the body includes at least one pair of panels of filtering material provided in a substantially V-shaped arrangement, so that at least one channel for the passage of air is define between the panels of the at least one pair of panels, wherein the filtering material of at least one of the panels includes a corrugated sheet of filtering material, wherein, on opposite surfaces thereof, a succession of corrugations and grooves are defined. The invention further concerns the method of manufacturing the cartridge as well as a filter equipped with the cartridge.

16 Claims, 7 Drawing Sheets

(51) Int. Cl.
  *B01D 46/12* (2006.01)
  *B01D 46/24* (2006.01)
  *B01D 46/52* (2006.01)
  *F02M 35/024* (2006.01)

(52) U.S. Cl.
  CPC ......... *B01D46/522* (2013.01); *F02M 35/0245* (2013.01); *F02M 35/02416* (2013.01); *B01D 2279/60* (2013.01)

(56) References Cited

FOREIGN PATENT DOCUMENTS

| | | |
|---|---|---|
| WO | WO 00/74818 A1 | 12/2000 |
| WO | WO 02/20132 A2 | 3/2002 |
| WO | WO 2005/037408 A1 | 4/2005 |
| WO | WO 2012/033748 A1 | 3/2012 |

* cited by examiner

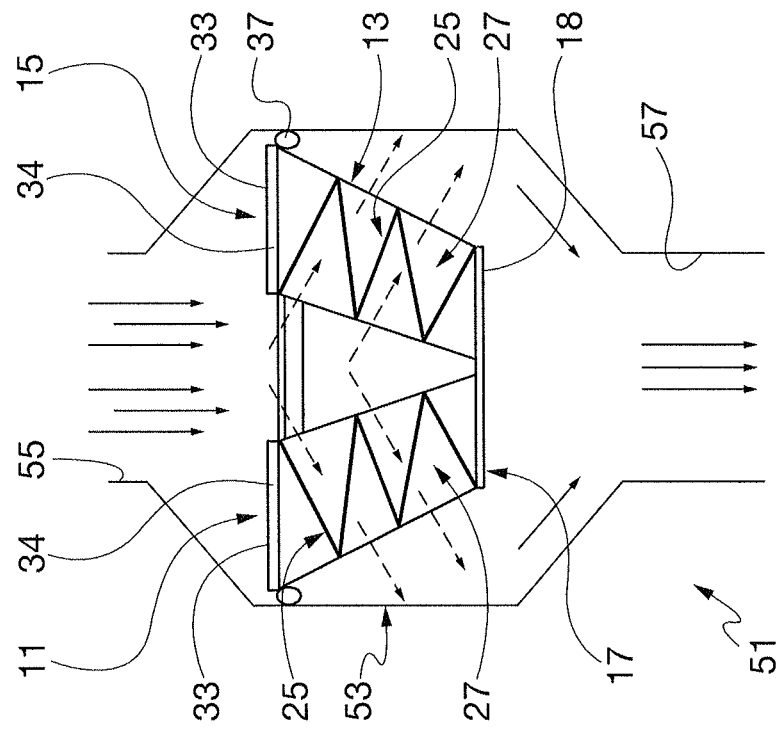
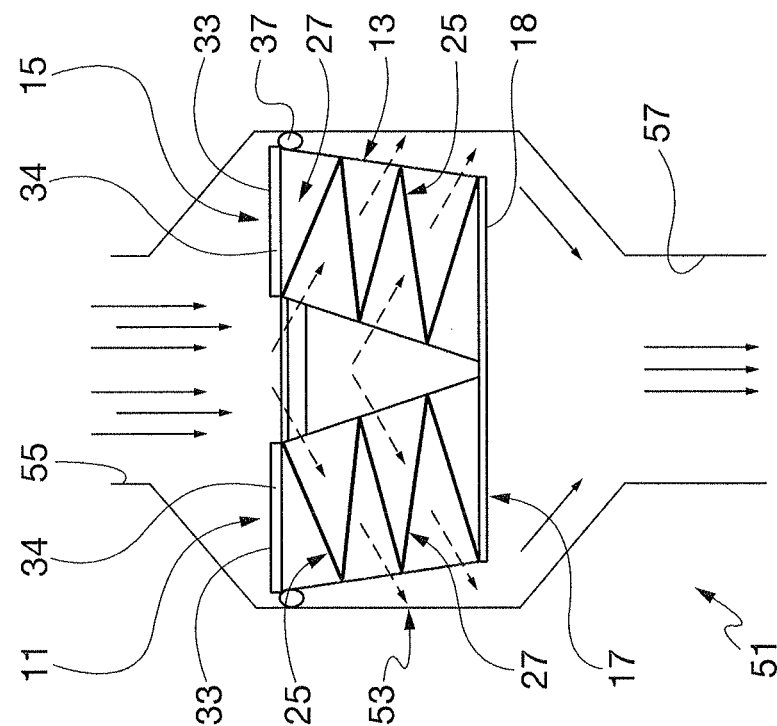

AIR FILTER CARTRIDGE FOR I.C. MOTORS, METHOD FOR ITS MANUFACTURE AND AIR FILTER INCORPORATING SAID CARTRIDGE

CROSS REFERENCE TO RELATED APPLICATIONS

This application is the U.S. National Phase Application of PCT/IB2013/051640, filed Mar. 1, 2013, which claims priority to Italian Patent Application No. TO2012A000185, filed Mar. 2, 2012, the contents of such applications being incorporated by reference herein.

TECHNICAL FIELD

The present invention relates to an air filter cartridge for I.C. motors, the method for its manufacture as well as an air filter incorporating said cartridge.

PRIOR ART

In the field of I.C. motors, especially of those motors intended for equipping land vehicles, it is known to use filters for purifying incoming air in the intake circuit of the motor.

Known air filters can be of different kinds and have different shapes, depending on their arrangement and uses. Known filter can include an interchangeable unit, called cartridge, which can be made for instance of a cellulose-based material or the like, for instance pleated paper. The cartridge is usually arranged within a housing having a cover and being provided with inlet openings and outlet openings for the air. Housing and cover can be made of plastic material and a sealing gasket can be provided between them to allow air to enter or exit the housing solely through the dedicated inlet and outlet openings without any leakage occurring between housing and cover.

At present, especially in the field of land vehicles, a strong need is felt for the availability of compact air filters, i.e. filters having reduced space requirements and high dust separation efficiency and being capable of generating a reduced differential pressure "ΔP" between the inlet and outlet of the air.

In order to meet this need, several architectures and forms were proposed in the past with respect to both the cartridge-receiving housing and the cartridge itself. Recent forms for filters provide parallelepipedal panel filters provided in V-shaped arrangement inside a prismatic housing.

EP 1189675 published as WO 00/74818, which is incorporated by reference, describes a cartridge with a V-shaped configuration comprising two rectangular panels of filtering material, wherein the filtering material is pleated paper. The pleated paper defines a series of parallel corrugations and grooves and is oriented in such a way that when the V-pack is arranged vertically the paper pleats also extend vertically. According to this arrangement, air enters the filter in a direction substantially parallel to the corrugations and grooves of the filtering cartridge.

This kind of V-arrangement has proved to be promising for the development of compact and efficient filtering cartridges.

One of the problems encountered in developing air filters is how to increase separation efficiency while keeping the outer size of the filter, and therefore its space requirements, unchanged or, more preferably, reducing such space requirements.

Usually the separation efficiency can be increased by increasing the surface of the filtering material that intercepts the air flow to be purified. This, however, is not a practicable solution, because it does not solve, but it rather worsens, the problem of the space requirements of the filter. Indeed, the increase of filtering surface obtained by increasing the size of the cartridge brings about an increase in the size and space requirements of the housing.

In the attempt to solve the aforementioned problem, for instance in the field of land vehicles, there are currently proposed filters configured for optimally exploiting the volumes available in the motor compartment. Such filters have therefore irregular shapes and involve high design and manufacturing costs.

SUMMARY OF THE INVENTION

An aspect of the present invention provides an air filter with improved performance and reduced space requirements.

Another aspect of the invention provides an air filter for I.C. motors that has a regular shape and therefore is adapted to be mounted on a wide range of vehicles.

A further aspect of the invention provides a filter of the aforesaid type that can be manufactured at reduced costs and therefore is suitable for large-scale industrial production.

Another aspect of the invention provides a method of manufacturing the air filter that allow to produce highly efficient standard air filters at reduced costs.

Advantageously, providing a V-shaped cartridge having at least one panel of non-uniform thickness allows to solve the problem of how to increase the separation efficiency of the filter while reducing its overall size.

The thickness of the panel of the V-shaped cartridge is chosen so as to define a corresponding filtering surface of variable width depending on the distance from the filter housing and on the direction of the air impacting against the panel.

Advantageously, in a preferred embodiment of the invention the filter cartridge has a single V-shaped or multiple VV . . . VV-shaped configuration and has a thickness that increases upon increase of the distance from the air inlet opening in the cartridge-receiving housing.

BRIEF DESCRIPTION OF THE DRAWINGS

Some preferred embodiments of the invention will be described by way of non-limiting example with reference to the attached drawings, in which:

FIG. 4 a schematic cross-section of a filter equipped with a cartridge according to a first embodiment of the invention;

FIG. 5 is a schematic cross-section of a filter equipped with a cartridge according to a second embodiment of the invention;

DESCRIPTION OF SOME PREFERRED EMBODIMENTS

Figure 1:
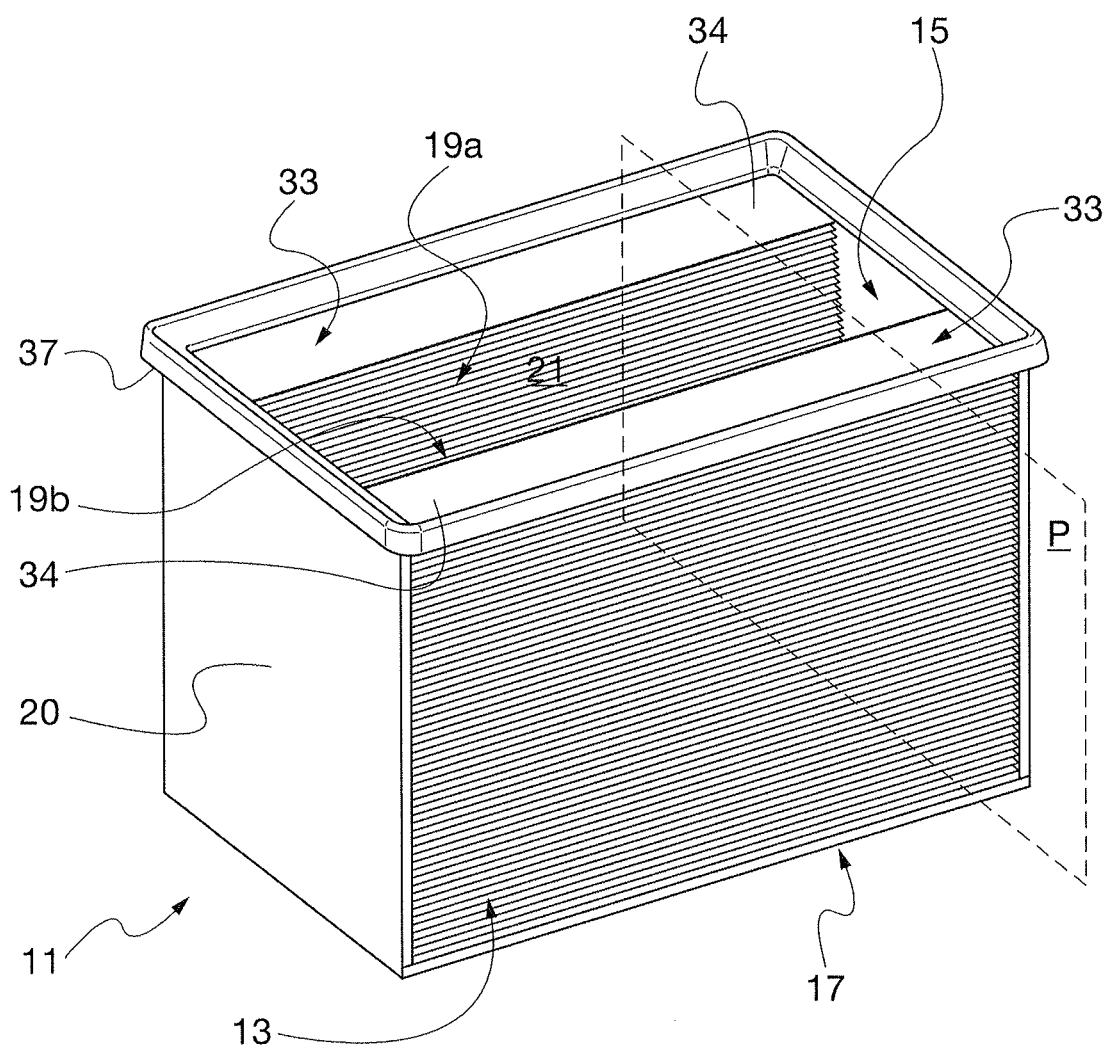
FIG. 1 is a top perspective view of a filter cartridge manufactured according to the invention.

In all the annexed figures identical reference numerals have been used to distinguish components that are equal of functionally equivalent; furthermore, the arrows in the figures indicate the air flow direction when the filter is in use.

Figure 2:
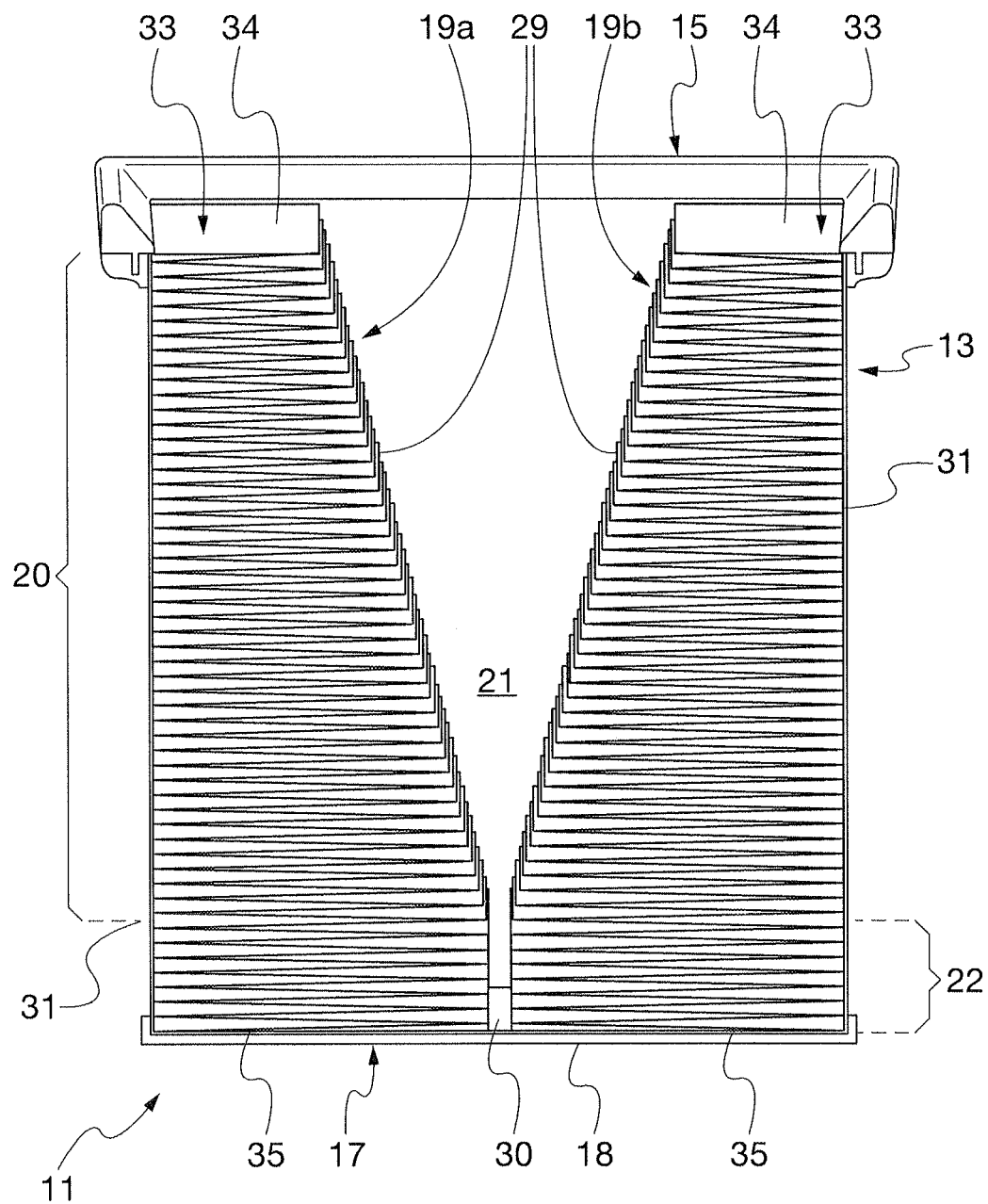
FIG. 2 is a cross-section of the cartridge along the plane "P" of FIG. 1.

Referring to FIGS. 1 and 2, there is illustrated an air filter cartridge, particularly for I.C. motors, made in accordance with a first embodiment of the invention and indicated in its whole by reference numeral 11.

In the illustrated embodiment, the cartridge 11 comprises a body 13 wherein, in the flow direction of the air to be filtered (i.e. from above downwards in FIGS. 1 and 2), an upstream face 15 and a downstream face 17 of the cartridge are defined. Still with reference to the illustrated embodiment, said upstream face 15 and downstream face 17 are substantially flat and lie on essentially mutually parallel planes. In other embodiments of cartridge it will be possible to provide that said planes are non-parallel or that the faces 15, 17 are non-flat, for instance curved.

In the illustrated example, the body 13 further has a parallelepipedal shape, but it will be possible to make said body also with other shapes, for instance with a cubic shape.

The body 13 comprises at least a pair of panels 19a,19b of filtering material, arranged in a V-shaped configuration, so that at least one channel 21 for the air passage from said upstream face 15 towards said downstream face 17 is defined between the panels 19a,19b.

Figure 3:
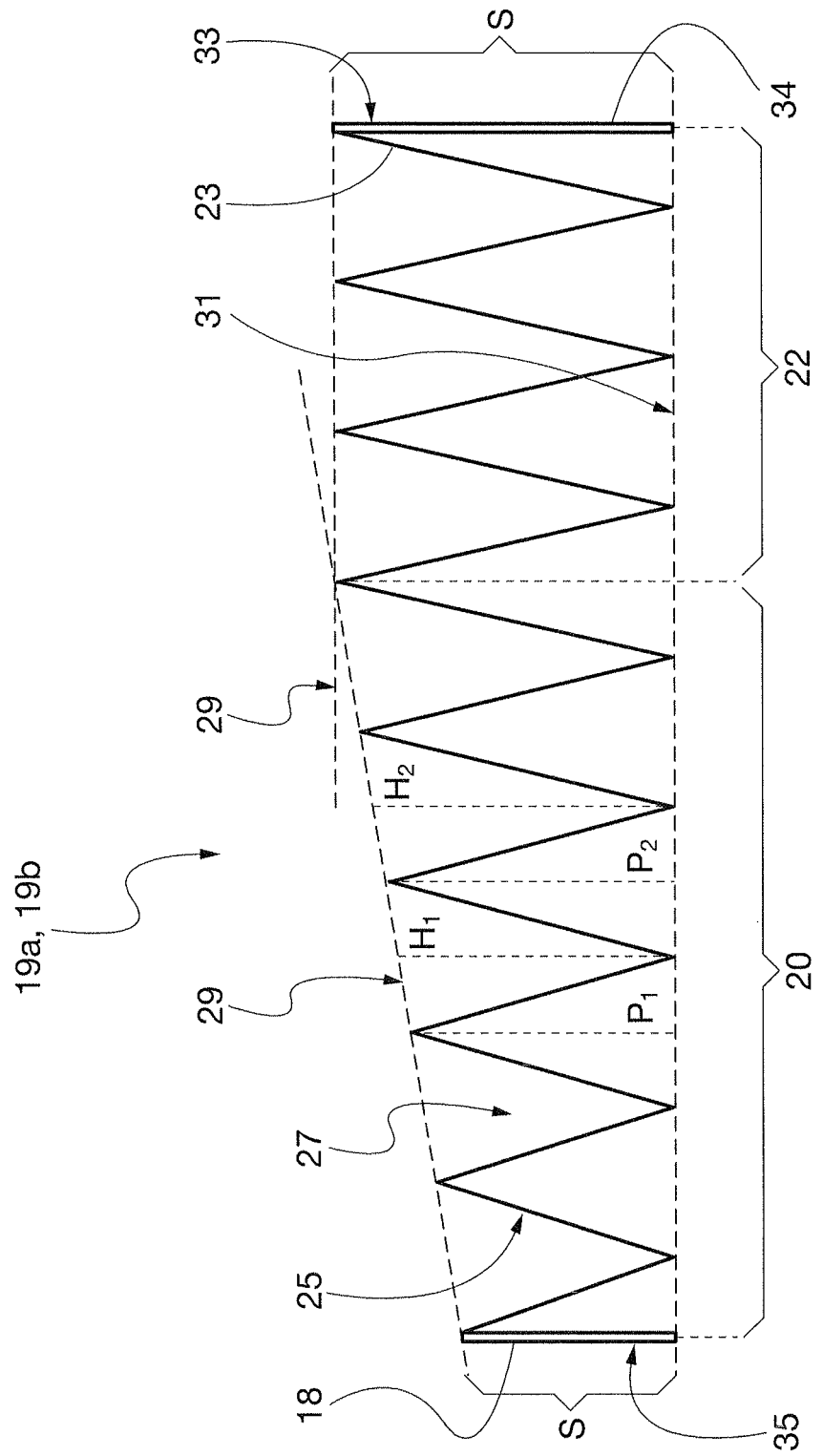
FIG. 3 is a cross-section along a plane perpendicular to the paper pleats, of a panel of the cartridge of FIG. 1.

As can better be seen in FIG. 3, the filtering material of at least one of the panels 19a,19b comprises a sheet 23 of filtering material wherein, on opposite surfaces thereof, a series of corrugations 25 and grooves 27 are defined.

In the annexed figures said corrugations 25 and grooves 27 are shown schematically and their width and pitch are represented by way of example only.

For instance the sheet 23 can consist of a sheet of air filter paper, corrugated by means of a folding machine of the known type, for instance a knife folding machine like the one described in EP-A-2168649, which is incorporated by reference. The sheet 23 can be made for instance of traditional paper for air filters or of a nanofiber-based material.

According to the invention at least two of the corrugations 25 of at least one of the panels 19a,19b have mutually different heights H1, H2, respectively. Similarly, the grooves 27 defined on the opposite face of the same panels 19a,19b, at the corrugations 25 of different height, will have mutually different depths P1, P2, respectively. Consequently, the corresponding panel 19a,19b will have a non-uniform thickness "S".

Referring again to FIGS. 1 and 2, in the illustrated embodiment, the height of the corrugations 25 in at least one portion 20 of the panels 19a,19b increases progressively from the upstream face 15 to the downstream face 17 of the cartridge 11. In other embodiments it will be possible, vice-versa, to provide that the height of the corrugations 25, in at least one portion of the panels 19a,19b, decreases progressively from the upstream face 15 to the downstream face 17. In still other embodiments it will be possible to provide that only one of the panels 19a,19b has corrugations 25 of increasing or decreasing height in at least one portion of the panel. According to the invention it will further be possible to provide that the height of the corrugations 25 varies according to a linear law or according to other profiles.

In the example shown, the corrugations 25 and the corresponding grooves 27 are mutually parallel and are parallel to said upstream face 15 and downstream face 17 of the cartridge.

Still referring to the illustrated example, the filtering material of both panels 19a,19b of the at least one pair of panels belonging to the cartridge 11, comprises a corrugated sheet 23 wherein the corrugations 25 each have a different height decreasing from the upstream face 15 to the downstream face 17 of the cartridge 11, in at least one portion 20. A possibly remaining region 22 of the panel has, instead, uniform thickness, wherein said corrugations 25 are of equal height.

The panels 19a,19b further define an upstream face 29 and a downward face 31 of the panels in the flow direction of the air to be filtered. It has to be noted that according to the invention it will be possible to provide a reverse arrangement in which the upstream face is the one indicated by the reference numeral 31 and the downstream face is the one indicated by the reference numeral 29.

In the example shown, the upstream face 29 and the downstream face 31 of the panels are substantially flat and mutually non-parallel in at least one portion 20 of the corresponding panel. In other embodiments the upstream face 29 and the downstream face 31 can be non-parallel over the entire length of the panel and/or non-flat, for instance curved.

According to a preferred embodiment of the invention, at least one of the panels 19a,19b of the cartridge 11 has its cross-section, i.e. the section parallel to the plane "P" of FIG. 1, substantially trapezoidal, like a rectangular trapezium in the example shown, in at least one portion 20 thereof.

The faces 33,35 of the panels 19a,19b oriented towards the upstream face 15 and the downstream face 17 of the cartridge, respectively, are preferably provided with a corresponding end plate 34 and 18, respectively. The end plates 34 and 18, if present, can possibly be airtight and/or have the function of reinforcing the structure of the cartridge 11.

It is known, indeed, that as the cartridge 11 becomes clogged with dirt during use, head losses and thus the pressure exerted on the end plate itself increase. The upstream face 15 of the cartridge 11 is open in its region comprised between the two panels 19a,19b for allowing entrance of air in the channel 21 defined between the panels 19a,19b, whereas the downstream face 17 of the cartridge 11 is closed, for instance by means of the end plate 18, for preventing exit of air through said downstream face 17 and forcing air to flow only laterally through the filtering material of the panels 19a,19b. The opposite ends of the grooves 27 are further preferably closed by side plates 26, preferably glued or welded to the panels 19a,19b, so as to seal the respective opposite ends of said grooves 27.

Referring to FIGS. 4 and 5, the cartridge 11 according to the invention can advantageously be incorporated in a filter 51 for purifying air for an I.C. motor, for instance a land vehicle.

The air filter 51 according to the invention comprises a housing 53 provided with an inlet 55 for the air to be filtered and an outlet 57 for the filtered air and has in its inside a filter cartridge 11 manufactured in accordance with the invention.

Between the cartridge 11 and the housing 53 there is provided a perimetral sealing gasket 37 surrounding the upstream face 15 of the body 13 of the cartridge 11.

The arrangements of FIGS. 4 and 5 differ from each other in that in the arrangement of FIG. 4 there is provided a cartridge 11 wherein the height of the corrugations increases from the open upstream face 15 of the cartridge towards the closed downstream face 17, whereas in the arrangement of FIG. 5, vice-versa, the height of the corrugations 25 decreases from the open upstream face 15 towards the closed downstream face 17.

Figure 6:
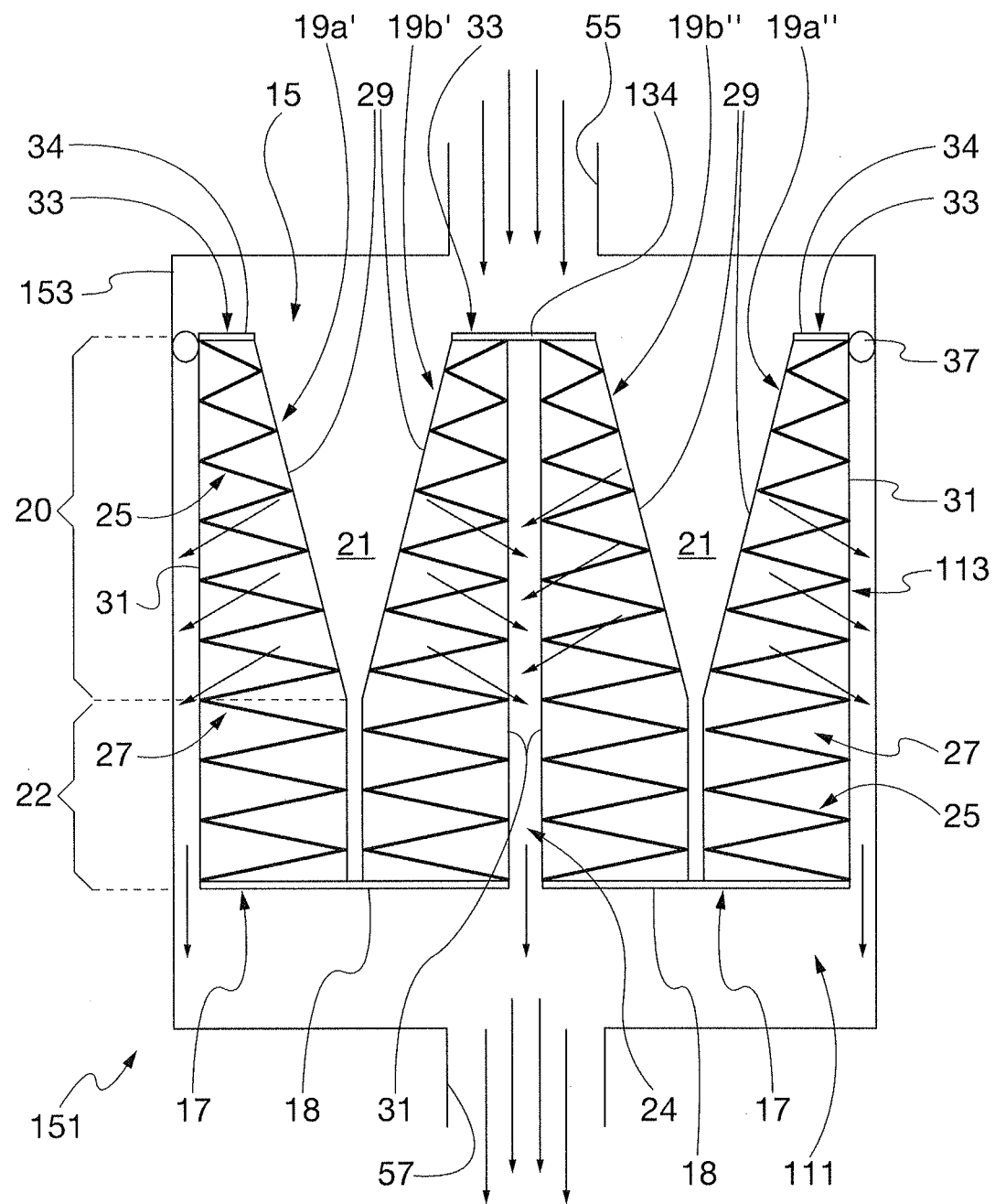
FIG. 6 is a schematic cross-section of a filter equipped with a cartridge according to a third embodiment of the invention.

Referring now to FIG. 6, there is illustrated a second embodiment of the cartridge according to the invention, wherein two pairs of panels 19a',19b' and 19a",19b" are provided. The cartridge according to this embodiment is indicated in its whole by reference numeral 111 and incorporated in a filter 151 having a housing 153.

In this embodiment the body 113 of the cartridge 111 comprises panels 19a',19b' and 19a",19b" each having a portion 20 where the corrugations 25 have a height increasing from the upstream face 15 of the cartridge towards the downstream face 17 and a portion 22 where the height of the corrugations 25 is substantially constant.

According to this arrangement, the pairs of panels 19a', 19b' and 19a",19b" are arranged side by side so as to define a channel 24 of adequate width for the exit of the air between the two adjacent panels 19b',19b". Furthermore, the channel 24 is closed at the upstream face 15 and for this reason the faces 33 of the adjacent panels 19b',19b" that are at the center of the cartridge 111 are mutually connected for instance by means of a single end plate 134 extending uninterruptedly between the two panels.

With reference in particular to FIGS. 7A to 7D, the method of manufacturing an air filter cartridge for I.C. motors according to the invention comprises the steps of:

providing a sheet of filtering material 23, for instance in the form of a roll;

corrugating said sheet 23 so as to form, on opposite surfaces thereof, a succession of corrugations 25 and grooves 27 wherein at least two corrugations 25 have mutually different height;

closing the opposite ends of the grooves 27 so as to obtain a panel 19a,19b of filtering material;

associating in a V-shaped arrangement said corrugated panel 19a,19b with a second panel or folding over itself in a V-shaped configuration said corrugated panel 19a, 19b, so as to define a cartridge body 13 wherein there are defined, in the flow direction of the air to be filtered, an upstream face 15 and a downstream face 17 of the cartridge, and a channel 21 between the panels 19a,19b for the passage of air.

Figure 7A:
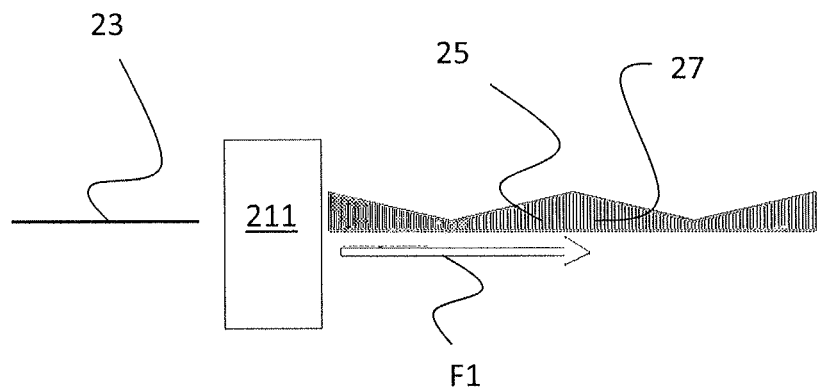
FIGS. 7A to 7D schematically show corresponding steps of the method of manufacturing the filter cartridge according to the invention.

The step of corrugating the sheet 23 can take place for instance by starting from a paper band that is subjected to a folding operation by means of an electronic knife folding machine 211 capable of folding to a progressively varying height the filtering means. In this way the result will be a continuous series of pleated paper pyramids as shown in FIG. 7A, where the arrow F1 indicates the advance direction of the production flow.

Figure 7B:
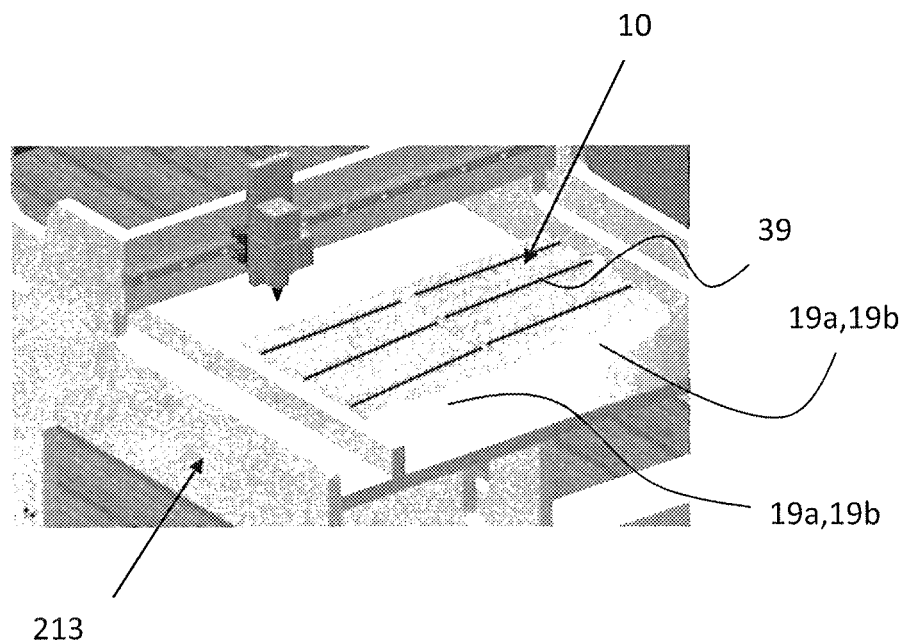

In this case the pleated band 23 is cut to the desired size and after this cutting operation the stack 10 of pleated paper is introduced into an appropriate mold 213 where, owing to the temperature reached and to the deposition of transverse beads of glue 39, the stack 10 is formed and maintained with the pleats correctly distanced as visible in FIG. 7B.

Figure 7C:
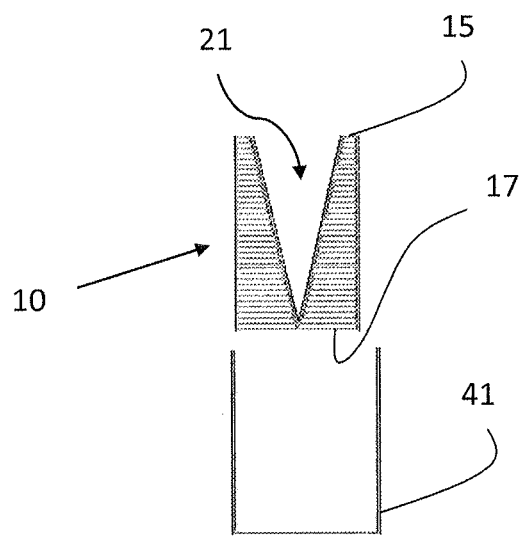
Figure 7D:
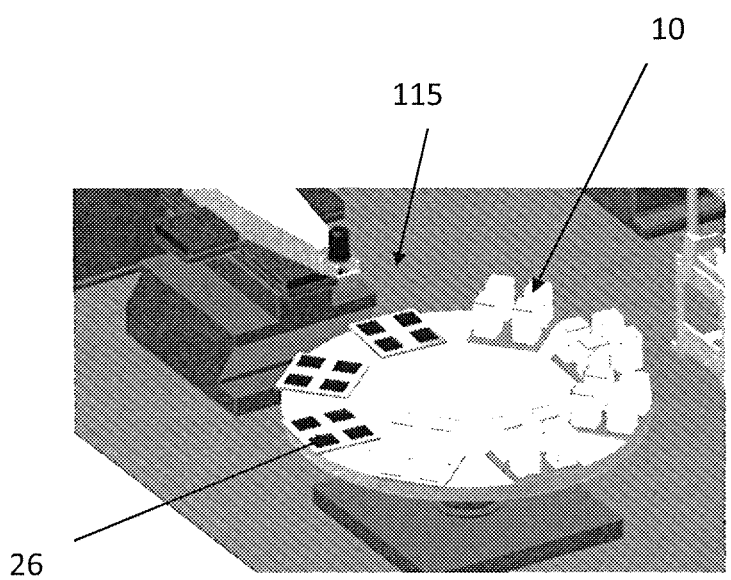

In a preferred embodiment of the invention, the stack 10 with the reinforcing beads of glue 39, is folded over itself substantially in half so as to form a double contiguous trapezium as visible in FIG. 7C and, where required, the stack in inserted in a reinforcing U-shaped element 41 of wire mesh or of plastics.

Subsequently, the V-shaped stack is introduced into a rotary machine 215 which allows the closing of the side walls of the panel 10 by means of a sealing material, for instance by means of the plates 26 glued to the side walls of the filtering material. This step is usually carried out in two stages, at first on one side on the stack 10 and then on the other side.

The final step of the method provides to introduce the filtering stack 10 into a mold for foaming the gasket 37 made of polyurethane, necessary for sealing the cartridge 11 thus obtained with the housing in which it will be received.

In the filter and the method as described and illustrated, several variants and modifications can be made falling within the same inventive principle.

The invention claimed is:

1. An air filter cartridge for I.C. motors, comprising a body having a parallelepipedal or cubic shape in which there are defined, in the flow direction of the air to be filtered, an upstream face and a downstream face of the cartridge, said body comprising at least a pair of panels of filtering material provided in a substantially V-shaped arrangement, so that at least one channel for the passage of air is defined between the panels of said at least one pair of panels, wherein the filtering material of at least one of the panels comprises a corrugated sheet of filtering material in which, on opposite surfaces thereof, a succession of corrugations and grooves are defined mutually parallel and parallel to said upstream face and said downstream face of the cartridge, wherein at least two of the corrugations have mutually different height, and wherein the grooves defined on an opposite face of a same panel, at the corrugations of different height, have mutually different depths.

2. The cartridge according to claim 1, wherein the height of the corrugations in at least one portion of at least one of the panels increases progressively from the upstream face to the downstream face of the cartridge or vice-versa.

3. The cartridge according to claim 1, wherein the filtering material of both panels of the at least one pair of panels comprises a corrugated sheet in which the corrugations have mutually different height.

4. The cartridge according to claim 1, wherein the panels define an upstream face and a downstream face of the panels in the flow direction of the air to be filtered and wherein said upstream and downstream faces of the panels are mutually non-parallel.

5. The cartridge according to claim 1, wherein at least one of the panels has a trapezoidal cross-section.

6. The cartridge according to claim 1, wherein the upstream face of the cartridge is open for allowing entrance of air in the channel defined between the panels and the downstream face of the cartridge is closed for preventing exit of air.

7. An air filter for I.C. motors, comprising a housing provided with an inlet for the air to be filtered and an outlet for the filtered air, and a filter cartridge manufactured in accordance with claim 1.

8. The filter according to claim 7, wherein between the cartridge and the housing there is provided a sealing gasket surrounding the upstream face of the body of the cartridge.

9. A method of manufacturing a filter cartridge for I.C. motors, comprising:

providing a sheet of filtering material;

corrugating said sheet so as to form, on opposite surfaces thereof, a succession of corrugations and grooves wherein at least two corrugations have mutually different height;

closing the opposite ends of the grooves so as to obtain a panel (19a,19b) of filtering material;

associating in a V-shaped configuration said corrugated panel with a second panel or folding over itself in a V-shaped configuration said corrugated panel, so as to define a cartridge body having a parallelepipedal or cubic shape wherein there are defined, in the flow direction of the air to be filtered, an upstream face and a downstream face of the cartridge, and a channel between the panels for the passage of air, said corrugations and grooves being mutually parallel and parallel to said upstream face and said downstream face of the cartridge, wherein the step of corrugating the sheet of filtering material is carried out in such a way as to define at least two corrugations of mutually different height and corresponding grooves defined on an opposite face of a same panel, at the corrugations of different height, having mutually different depths.

10. The method according to claim 9, wherein the corrugating the sheet of filtering material takes place by starting from a paper band that is subjected to a folding operation by an electronic knife folding machine capable of folding to a progressively varying height the filtering means thereby originating a continuous series of pleated paper pyramids.

11. The method according to claim 10, wherein the pleated band is cut to the desired size and after this cutting operation the stack of pleated paper so obtained is introduced into a mold where, owing to the temperature reached and to the deposition of transverse reinforcing beads of glue, the stack is formed and maintained with the pleats correctly distanced.

12. The method according to claim 11, wherein the stack with the reinforcing beads of glue, is folded over itself substantially in half so as to form a double contiguous trapezium.

13. The method according to claim 12, wherein the stack is inserted in a reinforcing U-shaped element of wire mesh or of plastics.

14. The method according to claim 13, wherein the stack is introduced into a rotary machine allowing the closing of the side walls of the stack by a sealing material comprising plates glued to the side walls of the filtering material.

15. The method according to claim 14, wherein a step is provided of introducing the stack into a mold for foaming a gasket made of polyurethane, for sealing the cartridge thus obtained with the housing in which it will be received.

16. The cartridge according to claim 2, wherein the filtering material of both panels of the at least one pair of panels comprises a corrugated sheet in which the corrugations have mutually different height.

* * * * *